(12) United States Patent
Boleko Ribas et al.

(10) Patent No.: US 11,022,284 B2
(45) Date of Patent: Jun. 1, 2021

(54) COMPUTER-CONTROLLED LIGHTING SYSTEM

(71) Applicant: PHILIPS LIGHTING HOLDING B.V., Eindhoven (NL)

(72) Inventors: Salvador Expedito Boleko Ribas, Barcelona (ES); Matthias Wendt, Wuerselen (DE); Volkmar Schulz, Wuerselen (DE); Dirk Valentinus René Engelen, Heusden-Zolder (NL)

(73) Assignee: SIGNIFY HOLDING B.V., Eindhoven (NL)

(*) Notice: Subject to any disclaimer, the term of this patent is extended or adjusted under 35 U.S.C. 154(b) by 493 days.

(21) Appl. No.: 15/428,418

(22) Filed: Feb. 9, 2017

(65) Prior Publication Data

US 2017/0153012 A1    Jun. 1, 2017

Related U.S. Application Data

(63) Continuation of application No. 12/528,455, filed as application No. PCT/IB2008/050678 on Feb. 26, 2008, now abandoned.

(30) Foreign Application Priority Data

Mar. 1, 2007    (EP) .................................... 07103334

(51) Int. Cl.
| | |
|---|---|
| *H05B 47/175* | (2020.01) |
| *G05B 15/02* | (2006.01) |
| *F21V 21/15* | (2006.01) |
| *H05B 47/105* | (2020.01) |

(52) U.S. Cl.
CPC .............. *F21V 21/15* (2013.01); *G05B 15/02* (2013.01); *H05B 47/105* (2020.01); *H05B 47/175* (2020.01)

(58) Field of Classification Search
None
See application file for complete search history.

(56) References Cited

U.S. PATENT DOCUMENTS

| | | | |
|---|---|---|---|
| 4,009,387 A | 2/1977 | Nuver | |
| 5,307,295 A | 3/1994 | Taylor et al. | |
| 5,751,341 A * | 5/1998 | Chaleki | A61B 1/00045 |
| | | | 348/65 |
| 6,175,196 B1 * | 1/2001 | Ragner | B60Q 1/326 |
| | | | 315/149 |
| 6,285,912 B1 * | 9/2001 | Ellison | G01K 1/16 |
| | | | 700/11 |

(Continued)

FOREIGN PATENT DOCUMENTS

| | | |
|---|---|---|
| EP | 0495305 A2 | 7/1991 |
| JP | 6314507 A | 11/1994 |
| JP | 2001223094 A | 8/2001 |

(Continued)

*Primary Examiner* — Jason Lin

(57) ABSTRACT

The invention relates to a computer-controlled lighting system which comprises an interface for defining a work surface within the lighting system and a desired illumination of the work surface, at least one luminaire for illuminating the work surface and a processing unit for automatically computing configuration parameters which allow configuring the at least one luminaire such that the desired illumination of the work surface is achievable.

20 Claims, 2 Drawing Sheets

(56) References Cited

U.S. PATENT DOCUMENTS

| | | | |
|---|---|---|---|
| 6,473,115 B1 * | 10/2002 | Harman | G02B 27/2235 |
| | | | 348/51 |
| 6,856,236 B2 | 2/2005 | Christensen et al. | |
| 6,990,394 B2 | 1/2006 | Pasternak | |
| 7,019,276 B2 | 3/2006 | Cloutier et al. | |
| 7,379,100 B2 | 5/2008 | Gokturk et al. | |
| 8,018,579 B1 | 9/2011 | Krah | |
| 2002/0140379 A1 * | 10/2002 | Chevalier | H05B 33/0803 |
| | | | 315/291 |
| 2002/0149940 A1 * | 10/2002 | Fruhm | F21S 2/00 |
| | | | 362/286 |
| 2003/0107887 A1 * | 6/2003 | Eberl | H01L 25/167 |
| | | | 362/227 |
| 2004/0105264 A1 | 6/2004 | Spero | |
| 2005/0231134 A1 | 10/2005 | Sid | |
| 2006/0020851 A1 | 1/2006 | Takahashi et al. | |
| 2006/0044152 A1 | 3/2006 | Wang | |
| 2008/0068372 A1 | 3/2008 | Krah | |
| 2008/0309884 A1 * | 12/2008 | O'Dor | H04N 9/3147 |
| | | | 353/7 |

FOREIGN PATENT DOCUMENTS

| | | | |
|---|---|---|---|
| JP | 2002015879 A | 1/2002 | |
| JP | 2002245102 A | 8/2002 | |
| JP | 2005216534 A | 8/2005 | |
| JP | 2006302517 A | 11/2006 | |
| JP | 2006528419 A | 12/2006 | |
| JP | 2008537305 A | 9/2008 | |
| WO | WO9512106 A1 | 5/1995 | |
| WO | WO2006111927 A1 | 10/2006 | |
| WO | WO2006136985 A1 | 12/2006 | |

* cited by examiner

COMPUTER-CONTROLLED LIGHTING SYSTEM

The invention relates in general to a computer-controlled lighting system, and in particular to the automatic configuration of the lighting system for achieving a desired illumination of a work surface.

One of the main goals of a lighting system is to provide a necessary illuminance or illumination level to desired locations or work surfaces. Lighting technology has evolved to a point where light fixtures can individually drive their outputted light level. By this way a user has an increased control to realise the necessary illuminance of the desired work surfaces. Another very relevant aspect to artificial lighting is the energy consumption, as artificial lighting becomes one of the largest parts of the energy bill. Whenever a plurality of controllable and possibly moveable or beam pattern configurable luminaries are integrated in a lighting infrastructure, it is one of the tasks of a lighting control or lighting management system to determine settings to be applied to the luminaries, so that a desired illuminance distribution is realised. Further, a resulting energy consumption of the lighting system shall not become unnecessarily high.

In order to configure a lighting system, lighting CAD (computer aided design) and visualisation tools can be used to obtain photorealistic visualisation of a light scene. Consequently, by a (guided) trial-and-error method, different combinations of settings of the lamps in the scene could be simulated until illuminance distributions resembling the ones intended as target on several work surfaces were achieved. This approach becomes unworkable whenever lighting installations featuring large numbers of controllable degrees of freedom, together with increasing number of target work surfaces are considered. The reason for that is that for such case, the number of possible combinations to be tested grows exponentially. Moreover, such tools require the geometry and layout of the considered room to be given as an input to the system, which can be quite a tedious work to do, for instance in absence of architectural floor plans, or specially whenever moveable light fixtures, or ones integrating turning elements are considered. On the other hand, very few of such tools can help to tackle energy efficiency/management aspects.

Currently, so-called "intelligent" illumination control systems are able to iteratively regulate the light level rendered by the light fixtures, until illuminance distributions resembling the ones intended as target on several work surfaces, and minimal power consumption are achieved. Furthermore, different from the prior approach (i.e. CAD-based), for this case no geometry information needs to be given as an input to the system. However, such a system relies on illuminance sensors to be permanently deployed at several points of the implied work surface or surfaces. Deployment can be more or less workable if the considered work surfaces physically exist, but it can also yield impossible for virtual work surfaces. Even when practical, such real-time systems might demand, according to the complexity of the lighting system in terms of available degrees of freedom, very long times to converge to a solution as the iterations must be performed either slow enough or with small enough illumination steps so that the vision of the people in the room does not get too disturbed by the change in the settings the controller brings about.

It is an object of the present invention to provide an improved lighting system.

The object is solved by the independent claim(s). Further embodiments are shown by the dependent claim(s).

A basic idea of the invention is to automatically compute a close estimation of configuration settings of a lighting system, which particularly in absence of daylight will be required by the lighting system to let an installed lighting equipment render a specified illuminance distribution. Further, provisions may be made such that wasted energy is kept to a minimum.

According to embodiments of the invention, a specification of an intended illumination may consist of numerical values expected at given reference measurement points at a work surface. According to further embodiments of the invention, also ranges of values instead of specific values at every reference measurement point may be specified, thus further enhancing the lighting system. Furthermore, embodiments of the invention might include constraints in a maximum-to-minimum illuminance ratio, which indicates the uniformity of the illumination distribution over a given surface.

With the invention, at least some of the limitations imposed by both lighting CAD tools and illumination control systems may be overcome. In particular, the embodiments of the invention allow automatically determining and entering the required geometrical information a room or space to be illuminated. Further embodiments of the invention allow automatically determining and entering locations and orientations of a plurality of installed light fixtures. There is no need to deploy illuminance detectors on physical work surfaces and there are no issues associated to sensors like photo-sensors, e.g. blinding, data fusion, data retrieval or maintenance. The invention has no limitation to physical work surfaces but offers the possibility to additionally consider virtual work surfaces. Further, energy consumption can be considered as one optimising criterion to obtain a good solution. There is an easy scalability and upgradeability of a lighting system according to the invention as additional lighting fixtures can be seamlessly added to the lighting system.

In the following, some important terms used herein are explained.

The term "luminaire" means any lamp, light fixture or light module comprising for example a lamp and an optic. The luminaire may be part of an installed lighting equipment or lighting infrastructure.

The term "work surface" means a real or virtual surface or location to be illuminated. The illuminated work surface or work surfaces define a light scene. The work surfaces may have any shape, for example planar, non-planar or spherical.

According to an embodiment of the invention, a computer-controlled lighting system is provided, comprising:
an interface for defining a work surface within the lighting system and a desired illumination of the work surface;
at least one luminaire for illuminating the work surface; and
a processing unit for automatically computing configuration parameters based on input parameters and information, wherein the configuration parameters allow configuring the at least one luminaire such that the desired illumination of the work surface is achievable.

The lighting system may be prepared for future light modules that will offer high configuration versatility in terms of dimming, number of lamps and beam directionality. Flexibility is only expected to grow and thereby the complexity of the needed lighting controls. The lighting system features a high scalability concerning a control of an arbitrary number of light sources. It allows a nearly real-time adjustment of illuminance scenes. Further, it provides an easy upgradeability of a layout of the lighting system and the luminaires and an easy and user-friendly specification of light scenes. There is no tedious and lengthy data entry required. Further there is no need for costly sensors to be used or deployed.

According to an embodiment of the invention, the processing unit may be configured to determine the configuration parameters based on one or more of the following input parameters and information: work surface parameters defining the work surface within the lighting system, illumination parameters defining the desired illumination of the work surface, a position information defining a position of the at least one luminaire within the lighting system and an orientation information defining an orientation of the at least one luminaire within the lighting system. This allows to adjust the configuration of the at least one luminaire under consideration of both, a topology of the lighting system and requirements concerning the work surface.

According to an embodiment of the invention, the interface may be configured to allow to input the work surface parameters and the illumination parameters and/or to retrieve the illumination parameters from an electronic file. Thus, the work surface and the corresponding illumination can be easily defined. The electronic file allows preparing, storing or changing the illumination parameters outside the lighting system.

The interface may be configured to provide a choice of possible work surface parameters and may be configured to allow inputting the work surface parameters by selecting the work surface parameters from the possible work surface parameters. The choice of possible work surface parameters frees a user of the lighting system from manually inputting the work surface parameters, for example by way of geometric coordinates.

The work surface parameters may define a location, a dimension and an orientation of the work surface. Thus, all necessary parameters for defining the work surface can be for example entered by a user into the lighting system.

According to an embodiment of the invention, the interface may comprise means for determining a location of the interface with regards to the light modules in the lighting system and may be configured to allow inputting at least one of the work surface parameters in relation to the location of the user interface. This allows determining and defining the intended work surface by moving the interface to locations being related to the work surface.

The interface may be configured to allow the user to input the work surface parameter defining the orientation in relation to the location of the user interface, or to select the location of the user interface as a centre of a spherical work surface and to select a radius of the spherical work surface. This allows defining the orientation of the work surface at the location of the interface just by selecting an angel which may be provided by the interface, or provides a fast and exact method for defining a spherical work surface.

The means for determining a location may be configured to determine the location based on a time-of-flight measurement or phase shift measurement of a transmitted signal. Transceivers required for such measurements are inexpensive and yield measurements that have a high resolution and a good accuracy.

According to an embodiment of the invention, the work surface comprises at least one planar, non-planar or spherical work surface. This allows defining any kind of desired work surfaces.

Further, the work surface may comprise a plurality of individual work surfaces each being defined by corresponding individual work surface parameters and corresponding individual illumination parameters. This allows defining an illumination of the work surface along a plurality of work surfaces.

According to an embodiment of the invention, the interface may be a handheld computer. A handheld computer is easy to handle by the user.

According to an embodiment of the invention, the at least one luminaire may comprise means for determining a position of the at least one luminaire within the lighting system and an output for providing the position information. This allows an automatic detection of the position of the at least one luminaire.

Further, the at least one luminaire may comprise means for determining an orientation of the at least one luminaire within the lighting system and an output for providing the orientation information. This allows an automatic detection of the orientation of the at least one luminaire.

The means for determining an orientation may be an angular position or orientation sensor. These sensors are useful for either robotic or manually movable luminaires. Alternatively, the at least one luminaire may comprise means for automatically moving the at least one luminaire and wherein the means for determining an orientation may be an angle encoder incorporated in the means for automatically moving. The angle encoder allows a determination of the orientation directly with a movement of the luminaire.

According to an embodiment of the invention, the at least one luminaire comprises a highly directional light source for transmitting a narrow beam usable for determining the orientation of the at least one luminaire. This allows determining the orientation of the luminaire without the need of a sensor integrated in the luminaire. The highly directional light source (jointly used with cameras) may be another means for determining an orientation as mentioned above.

The lighting system may further comprise at least one decoder being configured to detect the narrow beam for determining the orientation of the at least one luminaire, wherein the at least one decoder may be configured to provide the orientation information. Again, this allows determining the orientation of the luminaire without the need of a sensor integrated in the luminaire.

Further, the at least one luminaire may comprise an input for receiving at least one of the configuration parameters. This allows an automatic configuration of the luminaire.

According to an embodiment of the invention, the processing unit may comprise means for receiving the work surface parameters, the illumination parameters, the position information and the orientation information. This allows the processing unit to communicate with devices of the lighting system.

Further, the processing unit may be configured to receive photometric data of the at least one luminaire and to compute the configuration parameters based additionally on the photometric data. This allows a more accurate computation of the configuration parameters.

According to an embodiment of the invention, the processing unit may be configured to compute the configuration parameters by solving a non-linear mathematical programming problem. This allows the processing unit to compute the configuration parameters even for complex lighting systems and complex work surface requirements. Preferably, this problem may be solved through optimization, as an exact solution for the problem is non-existing for most instances.

The processing unit may be configured to compute the configuration parameters based on a point-by-point method, which estimates a contribution of each luminaire of the lighting system to each section of the work surface.

The point-by-point method may be based on the equation $$E(\{\theta_j, \psi_j, \theta_j, I_j\}_{j=1 \ldots Nl}) = E_{des}$$

$E_{des}$: vector of desired illumination values at a selected sections of the work surface (here, a vector is used as it is a "distribution of illuminance values over the work surfaces" what the control system intends to realize);

phi_j: luminous power of a jth luminaire;
psi_j: pan angle of the jth luminaire;
theta_j: tilt angle of the jth luminaire;
I_j: photometric distribution of the jth luminaire.

The left side of the equation may be replaced by the term:

$$\sum_{i=1}^{Nl} \phi_j \kappa_{ij} I_j(\beta_{ij}, \gamma_{ij})$$

kappa_{ij}: depends on a relative position of the jth luminaire with regards to the work surface an ith section belongs to;

I_j: represents a photometric distribution of the jth luminaire;

beta_{ij}, gamma_{ij}: are local to luminaire angular coordinates whose values depend upon a relative position between the ith section and the jth luminaire position which thence depends on the orientation of the luminaire.

Values of beta_{ij} and gamma_{ij}, which in turn depend on psi_j and theta_j, may be automatically determined, once pan and tilt angles of the luminaire have been chosen for a section, such that the term $$\sum_{i=1}^{Nl} \phi_j \kappa_{ij} I_j(\beta_{ij}, \gamma_{ij})$$

can be written as $$\sum_{i=1}^{Nl} \phi_j \cdot \iota_{ij}(\psi_j, \theta_j).$$

Further, the processing unit may be configured to solve the term $$\sum_{i=1}^{Nl} \phi_j \cdot \iota_{ij}(\psi_j, \theta_j)$$

by finding suited beam pattern, luminaire orientation and dimming levels so that the function $$\frac{1}{2}(E - E_{des})^T (E - E_{des})$$

is minimised when subject to the constraints $$0 \leq \phi_j \leq \phi_{j0}$$
$$0 \leq \psi_j \leq \psi_{j0}$$
$$0 \leq \theta_j \leq \theta_{j0}$$

which indicate the ranges of luminous flux, pan and tilt angles that can be yielded by a considered luminaire.

According to an embodiment of the invention, the illumination parameters may define a range for the desired illumination of the work surface and the processing unit may be configured to compute the configuration parameters such that the achievable illumination of the work surface is within the range. Defining a range of values for the desired illumination instead of exact values allows taking into account different visual performances of young and elderly people.

According to an embodiment of the invention, the processing unit may be configured to estimate a depreciation of a luminous power of the at least one luminaire over time, so that the configuration parameters can be computed based on an actual luminous power of the at least one luminaire. This allows the system to compensate for the ageing of luminaires.

Further, the processing unit may be configured to receive a power consumption profile of the at least one luminaire and may be configured to compute the configuration parameters based additionally on the power consumption profile such that an energy consumption of the at least one luminaire is minimized while the desired illumination of the work surface is still achievable. This allows an optimisation of the configuration of the at least one luminaire in view of energy consumption. The energy consumption may be defined by the term $$\sum_{j=1}^{Nl} p_j(\phi_j)$$

p_j: power consumption of the jth luminaire
phi_j: luminous power of the jth luminaire.

According to an embodiment of the invention, the processing unit may be configured to provide the configuration parameters to the at least one luminaire. This allows an automatic configuration of the at least one luminaire.

Further, the lighting system may comprise a system database being configured to automatically collect the position information and the orientation information and to provide the position information and the orientation information to the processing unit. This allows storing the information of the at least one luminaire.

According to a further embodiment of the invention, an interface device for a lighting system according to the invention is provided, comprising:

input means for allowing a user to define a work surface within the lighting system and to define a desired illumination of the work surface; and output means for providing work surface parameters which define the work surface within the lighting system and for providing illumination parameters which define the desired illumination of the work surface.

According to a further embodiment of the invention, a luminaire for a lighting system according to the invention is provided, comprising:

means for illuminating a work surface of the lighting system;

means for determining a position of the luminaire within the lighting system; and means for providing a position information which corresponds to the position of the luminaire within the lighting system.

According to a further embodiment of the invention, a processing unit for a lighting system according to the invention is provided, comprising:

means for receiving work surface parameters defining a work surface within the lighting system, illumination parameters defining a desired illumination of the work surface, a position information defining a position of at least one luminaire within the lighting system and an orientation information defining an orientation of the at least one luminaire within the lighting system; and means for computing configuration parameters which allow configuring the at least one luminaire of the lighting system such that the desired illumination of the work surface is achievable by the at least one luminaire.

According to a further embodiment of the invention, a method for establishing a lighting system according to the invention is provided, comprising:

defining a work surface within the lighting system and a desired illumination of the work surface;

providing at least one luminaire for illuminating the work surface; and computing configuration parameters which allow configuring the at least one luminaire such that the desired illumination of the work surface is achievable.

According to a further embodiment of the invention, a method for configuring at least one luminaire of a lighting system according to the invention is provided, comprising:

receiving work surface parameters defining a work surface within the lighting system, illumination parameters defining a desired illumination of the work surface, a position information defining a position of the at least one luminaire within the lighting system and an orientation information defining an orientation of the at least one luminaire within the lighting system; and computing configuration parameters which allow configuring the at least one luminaire of the lighting system such that the desired illumination of the work surface is achievable by the at least one luminaire.

According to a further embodiment of the invention, a computer program enabled to carry out a method according to an embodiment of the invention when executed by a computer is provided.

According to a further embodiment of the invention, a record carrier storing a computer program according to an embodiment of the invention is provided.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

In the following, functional similar or identical elements may have the same reference numerals.

Figure 1:
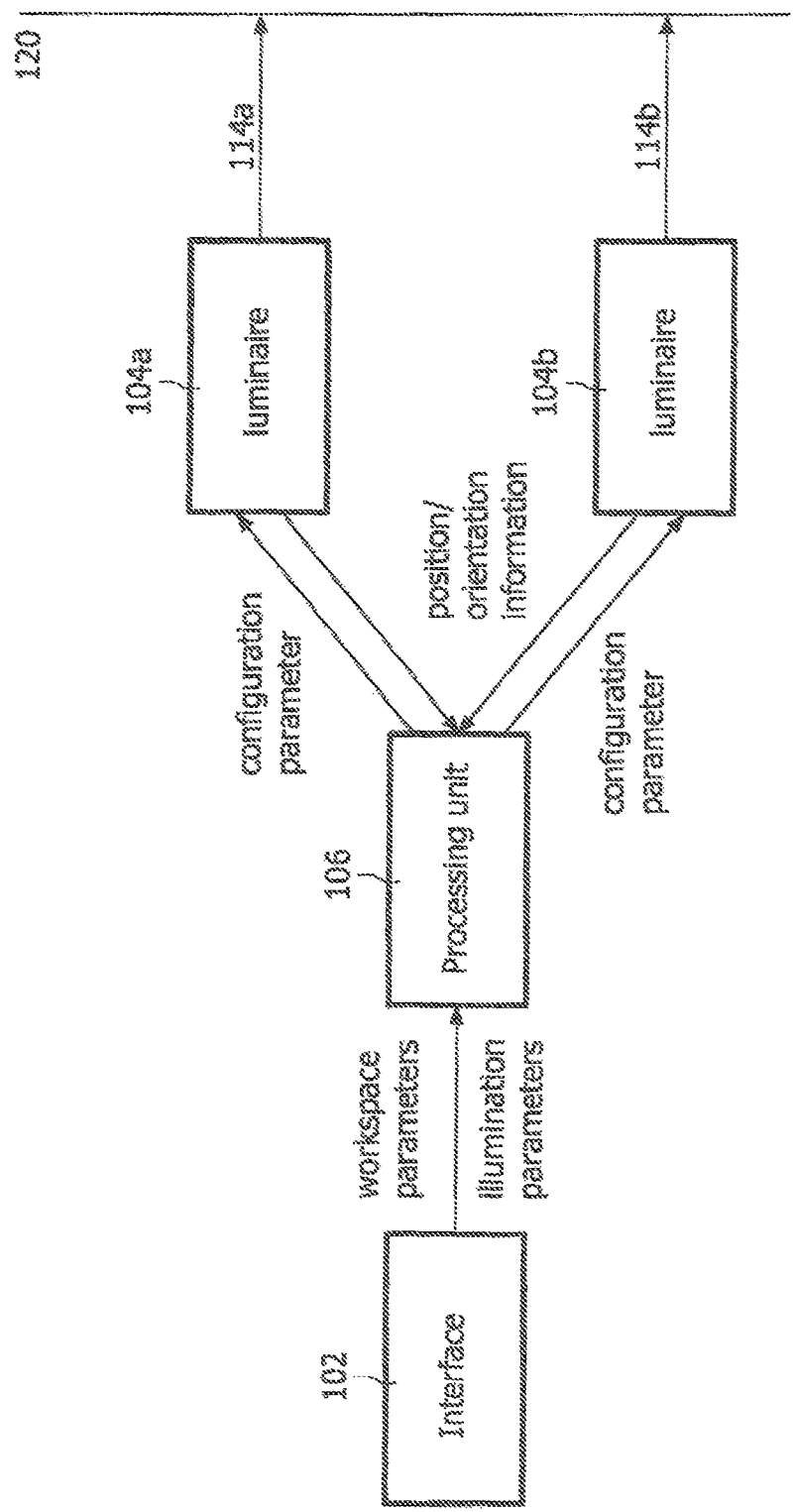
FIG. 1 shows a lighting system according to an embodiment of the invention.

FIG. 1 shows a lighting system according to an embodiment of the invention. The lighting system comprises an interface 102, at least one luminaire 104a, 104b and a processing unit 106. The interface 102 is configured to define a work surface 120 within the lighting system and to define (or retrieve) a desired illumination of the work surface 120. FIG. 1 shows exemplarily two luminaires 104a, 104b. The luminaires 104a, 104b illuminate the work surface 120 by transmitting light beams 114a, 114b. The processing unit 106 is configured to determine configuration parameters which allow configuring the luminaires 104a, 104b such that the desired illumination of the work surface 120 is achievable. The interface 102 is configured to provide workspace parameters and illumination parameters to the processing unit 106. The work surface parameters define the work surface 120 within the lighting system and the illumination parameters define the desired illumination of the work surface 120. The processing unit 106 comprises means for receiving the work surface parameters, the illumination parameters, the position information and the orientation information. The luminaires 104a, 104b are configured to provide position information to the processing unit 106. Additionally the luminaires 104a, 104b are configured to provide orientation information to the processing unit 106. Alternatively, the orientation information may be already known by the processing unit 106 or provided by other device (not shown in the Figures) to the processing unit 106. The position information defines a position of each of the luminaires 104a, 104b within the lighting system. The orientation information defines an orientation of each of the luminaires 104a, 104b within the lighting system. The orientation may also define a direction of the light beams 114a, 114b transmitted by the luminaire. The processing unit 106 is configured to compute the configuration parameters based on the received work surface parameters, illumination parameters, the position information and the orientation information.

The processing unit 106 provides the computed configuration parameters directly to the luminaires 104a, 104b. There may be individual configuration parameters provided to each luminaire. Alternatively, the processing unit 106 may provide the configuration parameters to a user or to a further configuration device which may configure the luminaires 104a, 104b based on the configuration parameters from the processing unit 106. In order to receive the configuration parameters, the luminaires 104a, 104b comprise an input. Further the luminaires 104a, 104b may comprise means controlling the luminaires 104a, 104b based on the received configuration parameters.

A plurality of individual work surfaces are defined for the lighting system. In other words, the work surface 120 may incorporate a plurality of individual work surfaces each being defined by corresponding individual work surface parameters and corresponding individual illumination parameters. The processing unit 106 is configured to compute the configuration parameters such that an optimal illumination of all individual work surfaces is achievable. The individual work surfaces may have different shapes and dimensions and may be arranged within the lighting system in any suitable way.

The interface 102 is a user interface which is configured to allow a user to define the workspace and the desired illumination. The user may input the work surface parameters and the illumination parameters. Alternatively the user may input data defining the workspace and the desired illumination in any other format and the interface 102 may be configured to determine the work surface parameters and the illumination parameters from the user input. For inputting the user data, the interface 102 may comprise a keyboard or any other suitable input means. The interface 102 is also configured to retrieve the illumination parameters from an electronic file provided by the user.

Furthermore, the interface 102 is configured to provide a choice of possible work surface parameters to the user.

Therefore, the interface 102 comprises a display or any suitable output means. Further, the interface 102 may be configured to allow the user to input the work surface parameters by selecting the intended work surface parameters from the possible work surface parameters.

The work surface parameters define a location, a dimension and an orientation of the work surface 120. In order to ease the input of the work surface parameters, the interface 102 comprises means (not shown in the Figures) for determining a location of the interface 102 within the lighting system. The means for determining a location are configured to determine the location based on a time-of-flight measurement or phase shift measurement of a transmitted signal. Further, the interface 102 is configured to allow the user to input at least one of the work surface parameters in relation to the location of the user interface 102. The interface 102 is further configured to allow the user to input the work surface parameter defining the orientation in relation to the location of the user interface 102. In case the user intends to input a spherical work surface, the interface 102 may be configured to allow the user to select the location of the user interface 102 as a centre of the spherical work surface and to allow the user to select a radius of the spherical work surface.

The work surface may also comprise a plurality of individual work surfaces each being defined by corresponding individual work surface parameters and corresponding individual illumination parameters.

The interface 102 may be a handheld computer or any other suitable movable or mobile device which provides an interface 102 between a user and the lighting system.

In order to provide the position information, each luminaire 104a, 104b may comprise means for determining a position of the luminaire 104a, 104b within the lighting system. Further each luminaire 104a, 104b may comprise an output for providing the position information. In order to provide the orientation information, each luminaire 104a, 104b or particular of the luminaires 104a, 104b may comprise means for determining an orientation of the luminaire 104a, 104b within the lighting system. Further each luminaire 104a, 104b having a means for determining an orientation may comprise an output for providing the orientation information. The means for determining an orientation may be an angular position or orientation sensor. In particular, if the luminaire 104a, 104b comprises means for automatically moving the luminaire 104a, 104b, the means for determining an orientation may be an angle encoder incorporated in the means for automatically moving.

Alternatively, the luminaire 104a, 104b may comprise a highly directional light source for transmitting a narrow beam usable for determining the orientation of the at least one luminaire 104a, 104b. In order to determine the orientation of the luminaire 104a, 104b, the lighting system may comprise a decoder being configured to detect the narrow beam and to determine the orientation based on the narrow beam. The decoder may further be configured to provide the orientation information.

The processing unit 106 is either implemented as a microprocessor with a memory containing a program configuring the microprocessor, or as dedicated hardware such as an ASIC (Application Specific Integrated Circuit) or (F)PGA (Programable Gate Array). Independent from the implementation, the processing unit 106 is configured for computing the configuration parameters. In order to compute the configuration parameters, the processing unit 106 comprises means for solving a non-linear mathematicalprogramming problem (Actually, the parameters are computed by means of optimization techniques and not actually solving the equation, as the equality might be unsolvable for some instances of a lighting system). This means may be implemented as a dedicated software or circuitry. The processing unit 106 may be additionally configured to compute the configuration parameters based on photometric data which specifies the luminaires 104a, 104b. The photometric data is stored in a memory of the processing unit 106 or received from the luminaires 104a, 104b. In order to consider aging of the luminaires 104a, 104b, the processing unit 106 is further configured to estimate a depreciation of a luminous power of the luminaires 104a, 104b over time. This allows the processing unit 106 to compute the configuration parameters based on an actual luminous power of the luminaires 104a, 104b.

In order to minimize the power consumption of the lighting system, the processing unit 106 is further configured to receive or store a power consumption profile of the luminaires 104a, 104b. The processing unit 106 is therefore additionally configured to compute the configuration parameters based on the power consumption profile such that an energy consumption of the luminaires 104a, 104b is minimized while the desired illumination of the work surface 120 is still achievable.

The illumination parameters may define a range for the desired illumination of the work surface 120. An user may be allowed to input the range into the interface 102 or to input different illumination values for a measurement point of the corresponding workspace. The processing unit 106 is configured to compute the configuration parameters such that the achievable illumination of the work surface 120 lies within the specified range.

Figure 2:
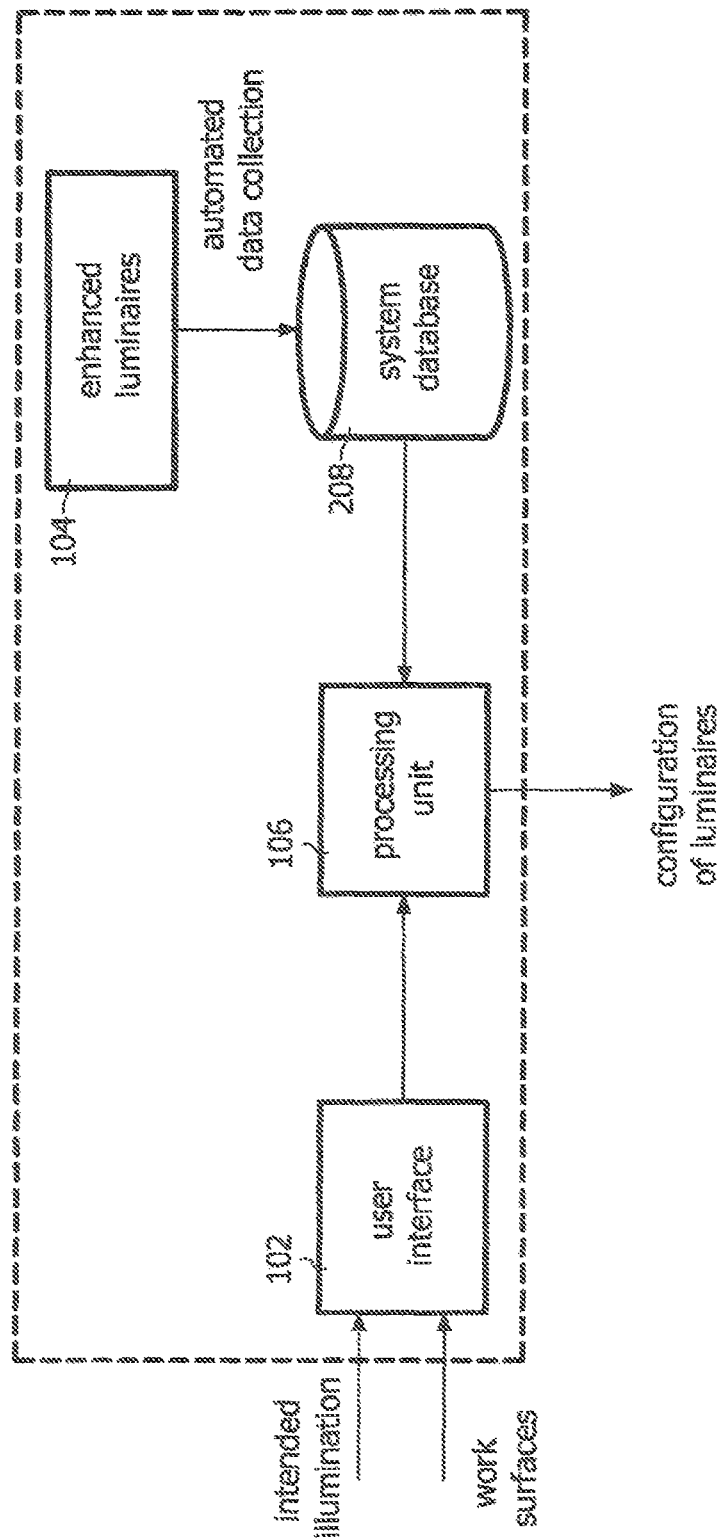
FIG. 2 shows a lighting system according to a further embodiment of the invention.

FIG. 2 shows a lighting system which comprises a user interface 102, enhanced luminaires 104, a processing unit 106 and a system database 208. The user interface 102 is configured to receive information about an intended illumination and work surfaces and is further configured to provide the received information to the processing unit 106. The system database 208 is configured to perform an automated data collection from the enhanced luminaires 104 and is further configured to provide the collected data to the processing unit 106. The processing unit 106 is configured to compute and provide data usable for a configuration of the enhanced luminaires 104. In difference to the lighting system shown in FIG. 1, the processing unit 106 cannot directly communicate with the enhanced luminaires 104.

As shown in FIG. 2, the lighting system incorporates advanced luminaires 104 which may be location aware and when needed also orientation aware by means of a built-in 3D position and orientation estimation system. The lighting system further incorporates a location aware, easy-to-use user interface 102 which may be used to determine the geometry, location, orientation and size of the work surfaces defining the light scene. The lighting system further incorporates a processing unit 106 or a plurality of processing units that calculate the configuration settings apposite to the intended illumination. The processing unit 106 may be configured to calculate the configuration settings for example from photometric data retrieved from the luminaires 104 in the system, e.g. the luminous intensity distribution or distributions, from characteristic plots or tables relating to emitted luminous flux or to configuration parameters of the luminaires 104 and from power consumption information, which can either be supplied by the manufacturers of the lighting equipment, built up from monitoring of the light fixtures or through measurements conducted by means of additional measurement equipment. The lighting system further incorporates communication technology allowing a transfer of data from the positioning system and local databases, associated to the luminaires 104, to the processing unit 106 or units. The lighting system further incorporates an easy scalability and upgradeability, concerning layout and new light units, of the lighting system.

The lighting system may be an advanced lighting control subsystem to be integrated to a light management system. The inventive approach automatically determines the settings of a lighting infrastructure needed to match the closest intended illumination distributions on several work planes, while energy consumption is minimised.

The inventive approach embraces a series of algorithms, elements and tools that allow an easy specification by the user of the desired illumination scene, autonomous retrieval and processing of needed information and computation of settings. The user interface 102 is used to define the desired illuminance distributions as well as the actual or real work surfaces on which the desired illuminance distributions shall be realised. A built-in auto-commissioning mechanism determines the position and spatial orientation of luminaires 104 with regards to the prior work surfaces. Photometric and energy management information is retrieved whenever needed from the luminaires 104 and finally, the processing unit 106 applies procedures to compute suited settings.

The lighting system may further comprise auto-commissioning tools for position estimation and orientation estimation. The location and orientation of the work surfaces relative to the luminaires 104 in the system should be known. The luminaires 104 may be self-aware of their location and orientation. Self-location awareness can be realised in several known ways. For position estimation, a 3D position estimation system using ultrasonic waves to measure a time-of-flight and/or phase shift between two transceivers may be incorporated. An application of multi-lateration techniques allows the determination of a relative position between reference transceivers and those transceivers in the luminaire. For example, a transceiver may be built in the luminaire. The multi-lateration technique may use three or more reference transceivers located at known, non-aligned reference points associated to a base coordinate system. More than three transceivers allow error correction due to the measure noise as it leads to an over-determined equation system. Ultrasonic transceivers are quite inexpensive and yield measurements that have high resolution and good accuracy. Alternatively any other suitable transceivers or position techniques may be used. The orientation estimation may be achieved in different ways dependent on the type of the luminaires 104. Different types of luminaires 104 may be incorporated into the lighting system.

Luminaires 104 that can be either panned or tilted by means of electrical motors or alike usually incorporate angle encoders or similar systems, which directly allow determining the spatial orientation of such moveable luminaires 104. For those luminaires 104 that can only be manually moved, spatial orientation awareness can be realised by means of available angular position or orientation sensors. Several alternatives are available to perform such measure, e.g. sensors featuring inertial devices such as accelerometers and gyroscopes, detectors applying polarised radio frequency illuminators and multiple waveguides or detectors that resort to optical methods. Angular position or orientation sensors can be easily integrated to luminaires 104, for example in form of integrated circuits.

Optical-based orientation estimation methods demand the luminaires 104 to integrate narrow-beam, i.e. highly directional, light sources, like for instance LEDs or laser pointers. Furthermore, they either require line-of-sight between a narrow beam light source and a detector, which would hinder the workability of the solution due to the need of deployment of the detector, or instead the use of cameras. If cameras were used in the room, they could be used to track the illuminated area (spot) created by the built-in highly directional on one surface of reference, and take a picture of it. As the location of the narrow-beam light source, the camera and the observed surface are known to the system, the orientation of the luminaire can be straightforwardly be determined through elementary geometry. Further accuracy could be achieved by using multiple cameras. Moreover, when multiple cameras were available, photogrammetry techniques, which allow determining physical coordinates out of photographs, could be also applied to obtain further geometrical (location/orientation) information about the installed luminaires.

Once determined, either locally at light module level or globally by previous storage the location and spatial orientation information is to be conveyed, through any convenient carrier communication technology, if needed, to either a central process unit or several process units if processing is performed in a distributed manner. The dimensions, location and shape of the work surfaces, on which illumination distributions are to be rendered, also need to be known to the system. To that purpose the system comprises a user interface 102 which, for instance, can be realised by means of a hand-held computer running suited software, which allows the user to input the location, dimensions and orientation of the work surface. Such portable user interface 102 could as well use the ultrasonic transceivers, used for position estimation of the luminaires 104, at reference points in order to determine its location and to offer to the user the choice of location-sensible, orientation options for the work surface, so that the user does not need to manually input geometric coordinates, but may just choose an orientation, e.g. horizontal, X degrees slanted or vertical work surfaces, and input the dimensions of the surface.

Moreover, the interface 102 device should also allow the specification of non-planar work surfaces. One example of that could be the specification of a cylindrical work surface to be defined around a manikin in order to specify a desired illumination distribution on the manikin. The knowledge by the system of the location of the hand-held device can be used to offer to the user several options regarding the orientation of the axis of such surface of revolution. Likewise, a spherical work surface can be defined where the location of the hand-held device is taken to be its centre, whilst a menu allows the selection of the wished radius. As the user interface 102 is aware of its location, its height with regard to the floor of, for example, a room is known. This may be used to limit for instance the radius of the defined spherical work surface or the height of the cylindrical work surface that the user can choose.

The hand-held interface 102 device might also retrieve the data that specifies the illumination distribution or distributions intended by the user on each of the defined work surfaces from an electronic file of suited format. Once the dimensions, geometry and locations of the work surfaces, as well as the locations and orientations of the luminaires 104 are known to the system, the information is transferred by any suited carrier communication technology to processor-based processing units for a computation of optimal lighting control values. The processing unit will calculate a lighting system configuration suited to the installed lighting system and to the illumination distributions given as an input by the user.

To perform the computation the system may demand some photometric data of the installed light fixtures, e.g. set of, far-field luminous-intensity distributions, which are associated to the lamps and optics used by the luminaires 104. Manufacturers normally provide such photometric data but they could also be optimally stored in the light units and be read by the computing element of the system during initialisation.

Several reference measurement-points can be chosen on the work surfaces that may have been given as an input to the system. The reference measurement-points may be chosen, for instance, by using uniform sampling grids. It is assumed that the desired illumination values in Lux at the reference measurement-points, i.e. the intended illumination distribution, are known and given as an input to the system, e.g. in form of a numerical array.

The lighting system may further comprise either a data base or incorporated detectors so that a depreciation of the luminous power over time can also be estimated and considered by the calculation. The database may be made up by statistical measurements provided by manufacturers. Alternatively the incorporated detectors may directly monitor the luminaires 104.

A "point-by-point" illumination method may be applied to estimate the contribution of each luminaire in terms of illumination to each point of the grid. Such method exploits the geometric and geographic input already collected by the processing unit. The application of the point-by-point method generally leads to a system of non-linear equations $$E(\{\phi_j, \psi_j, \theta_j, I_j\}_{j=1 \ldots Nl}) = E_{des}$$

where the column vector on the right side of the equation accounts for the desired illumination values at the measurement points of the different work surfaces. As for the unknown variables:

phi_j stands for the luminous flux, or luminous power, of the jth lamp;

psi_j and theta_j do severally stand for the pan and tilt angles of the jth lamp;

I_j represents the photometric distribution of the jth luminaire.

I_j is unknown, only if the luminaire can generate more than one photometric distribution or beam pattern.

The associated equation system is linear and the luminous fluxes are the only unknowns to be computed, only if all luminaires 104 in the lighting system are fixed and their associated three-dimensional luminous intensity distributions, the so-called photometric distributions, are unique, i.e. the luminaires do not generate multiple beam patterns, and solids of revolution.

Regarding the left side of the equality, it needs to be recalled that the superposition principle holds for light. As a result, and taking into account the definition of the "point-by-point" illumination method the ith equation should actually look like $$\sum_{i=1}^{Nl} \phi_j \kappa_{ij} I_j(\beta_{ij}, \gamma_{ij})$$

The value of kappa_{ij} depends on the relative position of jth lamp with regards to the work surface the ith measurement point belongs to, I_j represents the photometric distribution of the jth luminaire whilst beta_{ij} and gamma_{ij} are local to the luminaire angular coordinates whose values depend upon the relative position between the ith measurement point and the jth lamp, position which thence depends on the orientation of the luminaire.

As the absolute coordinate and orientation parameters of the luminaires 104 and of the measurement points on work surfaces are usually known with regard to the coordinate frame defined by the points the reference ultrasonic transceivers are at, the relative positions can be straightforwardly computed from them. Therefore, once a measurement point, pan and tilt angles of the lamp (luminaire) have been chosen, the values of beta_{ij} and gamma_{ij}, which in turn depend on psi_j and theta_j, are automatically determined. Consequently, the prior expression can be written as $$\sum_{i=1}^{Nl} \phi_j \cdot \iota_{ij}(\psi_j, \theta_j)$$

The solution to the problem demands finding suited beam pattern, luminaire orientation and dimming levels so that the following objective function is $$\frac{1}{2}(E - E_{des})^T (E - E_{des})$$

is minimised when subject to the constraints $$0 \leq \phi_j \leq \phi_{j0}$$

$$0 \leq \psi_j \leq \psi_{j0}$$

$$0 \leq \theta_j \leq \theta_{j0},$$

which indicate the ranges of luminous flux, pan and tilt angles that can be yielded by the considered light unit. More effective results can be achieved if the system enables to estimate, e.g. by means of statistics provided by the vendor, or measure, e.g. by means of sensors monitoring the lamps, the depreciation of the luminous power over time, so that the value of phi_{j,0} can be reliably estimated, and thus the system can compensate for the ageing of lamps.

According to the presented formulation, once a numerical solution has been computed, the pan and tilt angles are immediately available whereas the rest of the configuration parameters to be fed into the luminaires 104 to optimally render the desired illumination distribution described by vector E_{des}, can be easily back-calculated from the computed luminous flux values (phi_j). For instance, if dimming values are the additional configuration parameter, they can be straight forwardly determined from the luminous flux versus dimming value characteristic plot, which as earlier mentioned is also part of the set of data available to the system.

In order to take into consideration the energy consumption for the computation of an optimal solution, the formulation can be extended as for this case two, instead of one, objective functions are to be simultaneously handled. On the one hand, the one that valuates the illumination mismatch with regards to the intended illumination distribution, $$\frac{1}{2}(E - E_{des})^T (E - E_{des})$$

and on the other hand, the one that sums up the power consumption from the set of luminaires 104

$$\sum_{j=1}^{Nl} p_j(\phi_j)$$

As shown for the simplest previous case, the illumination is a function of the configuration and orientation of the luminaires 104 in the system. Usually, power consumption only depends on the luminous flux. Consequently, the associated multiple-criteria optimisation problem can be solved in a Pareto sense, by resorting to well-known techniques. According to the earlier presented formulation, the problem might also be formulated as a combinatorial programming problem, by considering several discrete angular values for the orientation of the luminaires 104. Such combinatorial and multi-objective optimisation can be naturally handled by using the optimisation techniques known as genetic algorithms. The choice of discrete valued for the pan and tilt angles, should not be a major drawback to derive a suited solution as very highly precise angular values might be senseless anyhow.

Again, similarly to the photometric data, the power consumption profiles associated to the luminaires 104 of the system are assumed to be either provided by the vendor and perhaps locally stored in a database built-in the luminaire, from which it can be retrieved whenever needed or acquired through, perhaps, built-in measurement equipment.

Once the processing unit has determined the suited configuration settings, its conversion onto apposite control commands to be fed into a lighting control system driving the luminaires 104 may be straightforward.

Finally, it is to be observed that intended illumination distributions can also be specified in terms of ranges, instead of using specific scalar values. For instance, in order to take into account the different visual performance of young and elderly people, using ranges to specify the target distributions appears to be convenient. In order to take into account such specifications, the objective function appraising the divergence from the desired illumination should be modified accordingly. Thus, if for a particular measurement ith point the illuminance range has been defined as the interval from E_{i, min} to E2_{i, MAX} then the associated objective function, hereinafter component-wise considered, yields zero if $$\sum_{i=1}^{Nl} \phi_j \cdot \iota_{ij}(\psi_j, \theta_j)$$

is within range and yields $$\sum_{i=1}^{Nl} \phi_j \iota_{ij}(\psi_j, \theta_j) - \frac{1}{2} \cdot (E_{i,min} + E_{i,MAX})$$

as a penalty, otherwise.

Similarly, the multi-objective approach also allows the specification of maximum-to-minimum uniformity ratios for the illumination distributions at one work surface by adding suited additional penalising objective functions.

Summarized, the invention relates to a lighting control system comprising light modules, user interface 102, database and a processing unit. In the system, no sensors are needed. Illumination distributions are mapped onto lighting control commands for a rendering of the illumination distributions. A focus lies on how to determine lamp parameters and how to set all available lamps automatically. An automatic scene setting may be achieved. Due to an automatic part the system may be controlled effect based and not lamp based.

The herein described invention may be applied to an automatic configuration and control of an indoor lighting infrastructure to reproduce one or several illuminance or illumination distributions at different chosen work surfaces, irrespective of the number of involved lamps or degrees of freedom in the lighting system.

Accordingly, the invention can be considered to be part of a lighting management system for highly complex and versatile installations.

Furthermore, the present invention might be an ideal supplement for another advanced lighting control solution for automatic light scene rendering, regarding coloured light scenes.

The described lighting system or the described apparatuses for a lighting system may comprise elements of different embodiments. The shown embodiments are exemplarily chosen.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A controllable lighting system for illuminating a work surface, the system comprising:
    an interface for defining one or more parameters of the work surface and a desired illumination of the work surface, the interface operable with a processing unit for determining a location of the work surface relative to one or more luminaires of a plurality of luminaires of the lighting system, wherein the interface is a handheld or mobile computing device;
    the plurality of luminaires for illuminating the work surface, the one or more luminaires including a motor for moving the one or more luminaires and a sensor for determining one or more parameters associated with position and/or orientation thereof within the lighting system;
    the processing unit operable for determining configuration parameters based at least in part on the position and/or orientation parameters of the one or more luminaires, wherein the configuration parameters facilitate configuring the one or more luminaires such that the desired illumination of the work surface is achievable;
    wherein the work surface comprises a plurality of sections and wherein processing unit is configured to determine the configuration parameters based on a plurality of reference measurement points on the work surface to calculate a point-by-point analysis which estimates a contribution of each luminaire of the one or more luminaires of the lighting system to each section of the work surface.

2. The lighting system of claim 1, wherein the processing unit is configured to determine the configuration parameters further based at least on one or more work surface parameters defining location, at least one dimension and/or an orientation of the work surface within the lighting system and one or more illumination parameters defining the desired illumination of the work surface.

3. The lighting system of claim 1, wherein the interface is configured to allow to input the work surface parameter defining the orientation thereof in relation to the location of the interface, or to select the location of the interface as a centre of a spherical work surface and to select a radius of the spherical work surface.

4. The lighting system of claim 1, wherein the interface is configured to determine the location based on a time-of-flight measurement or phase shift measurement of a transmitted signal.

5. The lighting system of claim 1, wherein the sensors include an angular position or orientation sensor.

6. The lighting system of claim 1, wherein the one or more luminaire comprises a directional light source configured to generate a narrow beam for determining the orientation of the one or more luminaire.

7. The lighting system of claim 1, further comprising at least one decoder being configured to detect a narrow beam for determining the orientation of the one or more luminaire.

8. The lighting system according to claim 1, wherein the processing unit is configured to receive photometric data of the one or more luminaire and to determine the configuration parameters further based on the photometric data.

9. The lighting system of claim 1, wherein the illumination parameters define a range for the desired illumination of the work surface and the processing unit is configured to determine the configuration parameters such that the achievable illumination of the work surface is within the range.

10. The lighting system of claim 1, wherein the processing unit is configured to estimate a depreciation of a luminous power of the one or more luminaire over time, so that the configuration parameters can be determined based on an actual luminous power of the at least one luminaire.

11. The lighting system of claim 1, wherein the processing unit is configured to receive a power consumption profile of the one or more luminaire and is configured to determine the configuration parameters further based on the power consumption profile such that an energy consumption of the one or more luminaire is minimized while the desired illumination of the work surface is still achievable.

12. A controllable lighting system for illuminating a work surface, comprising:
an interface operable to define one or more parameters of the work surface and a desired illumination of the work surface, the interface operable to determine a location of the work surface relative to one or more luminaires of a plurality of luminaries of the lighting system, wherein the interface is a handheld or mobile computing device;
the plurality of luminaires for illuminating the work surface, the one or more luminaires each including a motor for moving the one or more luminaires and a sensor to determine parameters associated with position and/or orientation within the lighting system;
a processing unit for determining configuration parameters based at least in part on the position parameters of the one or more luminaires;
wherein the configuration parameters facilitate configuring each of the one or more luminaires such that the desired illumination of the work surface is achievable;
the processing unit operable to determine the configuration parameters which estimates a contribution of each luminaire of the one or more luminaires to each of a plurality of sections of the work surface.

13. The lighting system of claim 12 wherein the processing unit is configured to determine the configuration parameters based on one or more of the following input parameters and information:
work surface parameters defining the work surface within the lighting system, illumination parameters defining the desired illumination of the work surface;
wherein the interface is configured to allow input of the work surface parameters and the illumination parameters and/or to retrieve the illumination parameters from an electronic file;
wherein the interface is further configured to provide a choice of possible work surface parameters and is configured to allow inputting the work surface parameters by selecting the work surface parameters from the possible work surface parameters;
wherein the work surface parameters define the location, a dimension and an orientation of the work surface.

14. The lighting system of claim 12, wherein the work surface comprises one or more of the following: at least one planar, non-planar or spherical work surface; a plurality of individual work surfaces each being defined by corresponding individual work surface parameters and corresponding individual illumination parameters.

15. The lighting system of claim 12, wherein the sensor for determining orientation information is an angular position or orientation sensor, or wherein the sensor for determining orientation information is an angle encoder incorporated in the means for automatically moving the one or more luminaire.

16. A computer-controlled lighting system, comprising:
an interface for defining a work surface within the lighting system and a desired illumination of the work surface, said work surface within the lighting system and said desired illumination of the work surface representing input parameters to a processing unit which is included in said computer-controlled lighting system, the interface operable to determine a location of the work surface relative to one or more luminaires of a plurality of luminaries of the lighting system, wherein the interface is a handheld or mobile computing device;
a plurality of luminaires for illuminating the work surface, wherein the luminaires each includes a position estimation system of the luminaire within the lighting system and an output for providing the position information, and wherein the luminaires each include means for determining orientation information of the luminaire within the lighting system and an output for providing the orientation information; and
the processing unit for automatically computing configuration parameters based on input parameters provided by the interface and said position information and said orientation information determined by said position estimation system and sensor of the luminaires such that the desired illumination of the work surface is achievable;
wherein each luminaire comprises means for automatically moving the luminaire.

17. The lighting system of claim 16 wherein the interface is operable to determine a location of the interface with regards to light modules in the lighting system and is configured to allow inputting at least one of the work surface parameters in relation to the location of the interface;
wherein the interface is configured to allow to input the work surface parameter defining the orientation in relation to the location of the interface, or to select the location of the interface as a centre of a spherical work surface and to select a radius of the spherical work surface;

wherein the interface is configured to determine the location based on a time-of-flight measurement or phase shift measurement of a transmitted signal.

18. The lighting system of claim 16, wherein the one or more luminaires comprise a directional light source for transmitting a narrow beam usable for determining the orientation of the one or more luminaire, and further comprises at least one decoder being configured to detect the narrow beam for determining the orientation of the one or more luminaire, wherein the at least one decoder is configured to provide the orientation information.

19. The lighting system according to claim 16, wherein the processing unit is configured to receive photometric data of the one or more luminaires and to compute the configuration parameters based additionally on the photometric data.

20. The lighting system of any of claim 16, wherein the processing unit is operable to compute the configuration parameters based on a point-by-point method which estimates a contribution of each luminaire of the one or more luminaires of the lighting system to each section of the work surface.

* * * * *